US010821897B2

(12) United States Patent
Kim et al.

(10) Patent No.: US 10,821,897 B2
(45) Date of Patent: Nov. 3, 2020

(54) METHOD AND DEVICE FOR ADJUSTING DRIVER ASSISTANCE APPARATUS AUTOMATICALLY FOR PERSONALIZATION AND CALIBRATION ACCORDING TO DRIVER'S STATUS

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/738,579

(22) Filed: Jan. 9, 2020

(65) Prior Publication Data
US 2020/0247321 A1  Aug. 6, 2020

Related U.S. Application Data

(60) Provisional application No. 62/799,296, filed on Jan. 31, 2019.

(51) Int. Cl.
*B60R 1/04* (2006.01)
*G06K 9/00* (2006.01)
*G06F 3/01* (2006.01)

(52) U.S. Cl.
CPC ............. *B60R 1/04* (2013.01); *G06F 3/013* (2013.01); *G06K 9/00248* (2013.01); *G06K 9/00369* (2013.01); *G06K 9/00845* (2013.01)

(58) Field of Classification Search
CPC ........ B60R 1/04–089; G06F 3/00–013; G06K 9/00248; G06K 9/00369; G06K 9/00845
See application file for complete search history.

(56) References Cited

U.S. PATENT DOCUMENTS

| 2008/0036580 | A1  | 2/2008 | Breed |
| 2010/0080416 | A1* | 4/2010 | Lee ................... G06K 9/00248 382/103 |

(Continued)

FOREIGN PATENT DOCUMENTS

CN    108657029 A  * 10/2018

OTHER PUBLICATIONS

Bulat, Adrian, and Georgios Tzimiropoulos. "Human pose estimation via convolutional part heatmap regression." European Conference on Computer Vision. Springer, Cham, 2016.

(Continued)

*Primary Examiner* — Aaron L Troost
(74) *Attorney, Agent, or Firm* — Husch Blackwell LLP

(57) ABSTRACT

A method for adjusting a position of a driver assistance device according to a driver state is provided. The method includes steps of: a position adjusting device, (a) inputting an upper and a lower body images of a driver, acquired after the driver sits and starts a vehicle, into a pose estimation network, to acquire body keypoints, calculate body part lengths, and adjust a driver's seat position; and (b) while the (Continued)

vehicle is traveling, inputting the upper body image into a face detector to detect a facial part, inputting the facial part into an eye detector to detect an eye part, and inputting the adjusted driver's seat position and 2D coordinates of an eye into a 3D coordinates transforming device, to generate 3D coordinates of the eye referring to the 2D coordinates and the driver's seat position, and adjust a mirror position of the vehicle referring to the 3D coordinates.

16 Claims, 4 Drawing Sheets

(56) References Cited

U.S. PATENT DOCUMENTS

| 2012/0053794 | A1* | 3/2012 | Alcazar | B60N 2/0244 |
| | | | | 701/48 |
| 2016/0368509 | A1 | 12/2016 | Uppal | |
| 2019/0172224 | A1* | 6/2019 | Vajda | G06T 7/77 |

OTHER PUBLICATIONS

Froba, Bernhard, and Andreas Ernst. "Face detection with the modified census transform." Sixth IEEE International Conference on Automatic Face and Gesture Recognition, 2004. Proceedings . . . IEEE, 2004.

* cited by examiner

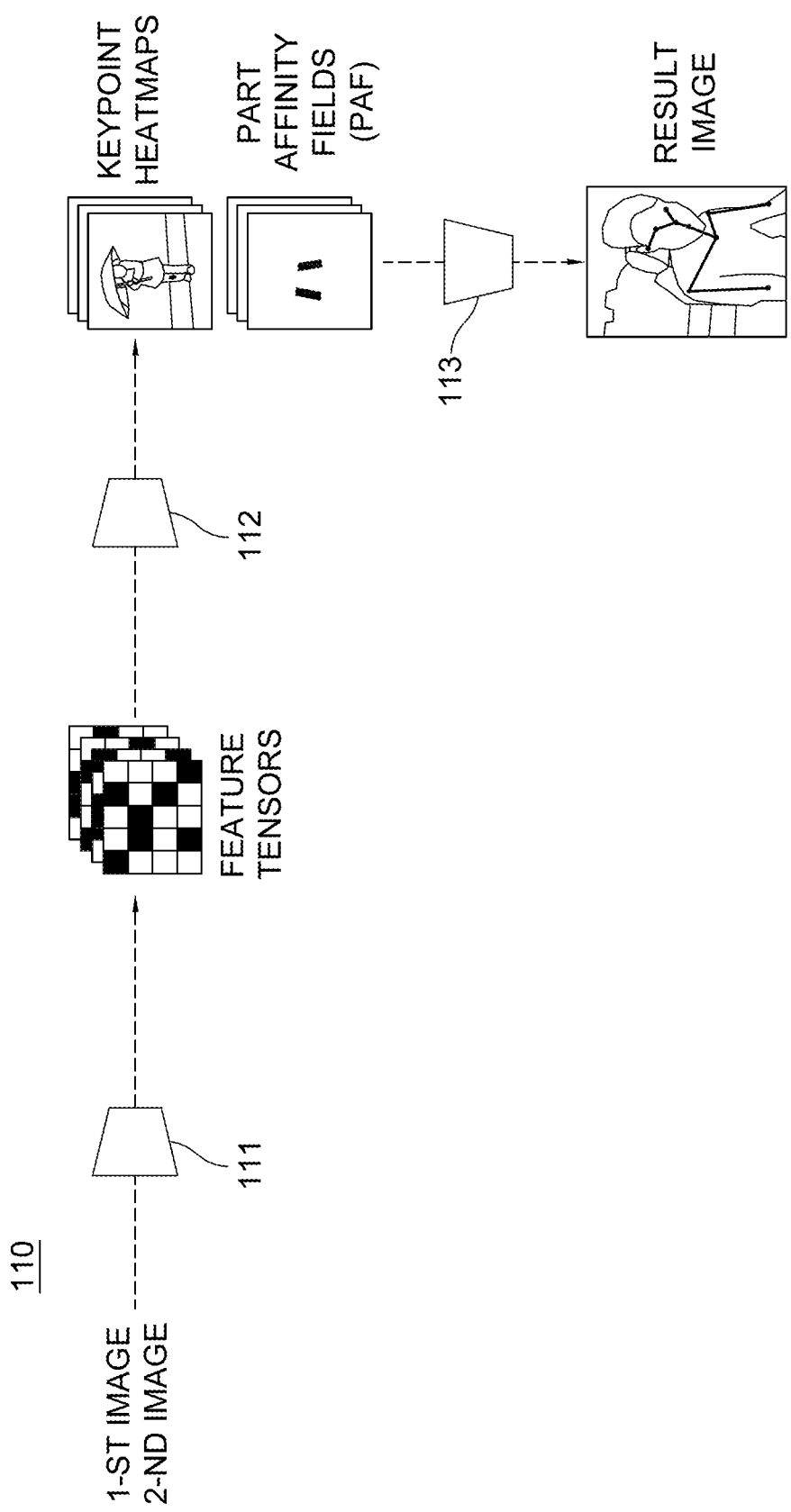

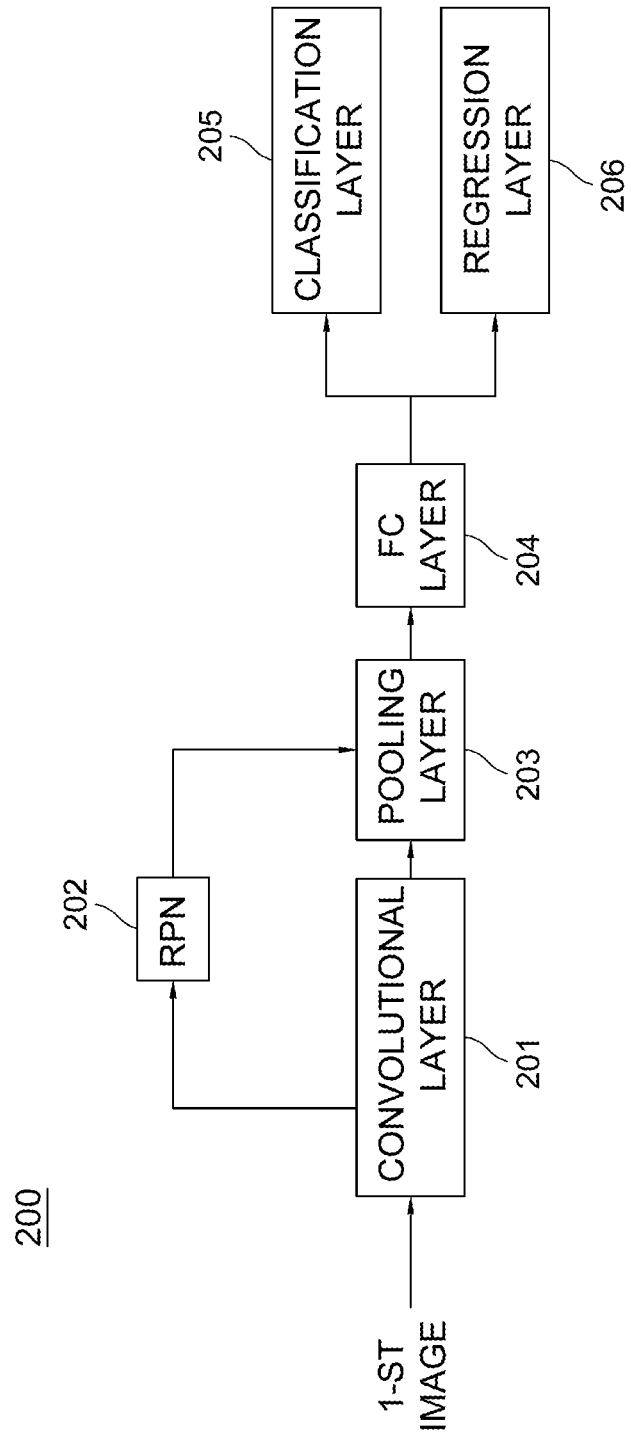

METHOD AND DEVICE FOR ADJUSTING DRIVER ASSISTANCE APPARATUS AUTOMATICALLY FOR PERSONALIZATION AND CALIBRATION ACCORDING TO DRIVER'S STATUS

CROSS REFERENCE TO RELATED APPLICATION

This application claims the benefit of priority to U.S. Provisional Patent Application No. 62/799,296, filed on Jan. 31, 2019, the entire contents of which being incorporated herein by reference.

FIELD OF THE DISCLOSURE

The present disclosure relates to a driver assistance device of a vehicle; and more particularly, to a method and a device for automatically adjusting the driver assistance device according to a driver state.

BACKGROUND OF THE DISCLOSURE

Generally, when driving a vehicle, one should always keep an eye on a front of the vehicle and on a rear at a same time, and thus a mirror is mounted on the vehicle so that a driver can see the rear while looking at the front.

Meanwhile, a total of three mirrors are generally arranged on the vehicle, one inside at the front and each one outside at each front door on a left and a right.

A side-view mirror is provided on both sides of the front doors of the vehicle to assist the driver in securing the rear view on sides of the vehicle. A rear-view mirror is provided in an inside front on a windshield of the vehicle to assist the driver in securing the rear view of the vehicle.

Herein, if it is difficult for the driver to secure the rear view through the mirrors, angles of the rear-view mirror and the side-view mirrors can be manually adjusted to secure the view.

In addition, the driver must adjust a position of a driver's seat to suit his or her physical condition.

However, there is a problem in that, in order for the driver to drive the vehicle in which the positions of the driver's seat and the mirrors have been adjusted by another driver, the positions of the driver's seat and the mirrors must be adjusted again to fit his or her physical condition.

Accordingly, the inventors of the present disclosure propose a method for automatically adjusting the positions of the mirrors and the driver's seat in accordance with the physical condition of the driver.

SUMMARY OF THE DISCLOSURE

It is an object of the present disclosure to solve all the aforementioned problems.

It is another object of the present disclosure to automatically adjust a driver assistance device according to a driver state.

It is still another object of the present disclosure to automatically adjust a position of a driver's seat and one or more positions of one or more mirrors according to the driver state.

It is still yet another object of the present disclosure to automatically adjust the positions of the mirrors in real-time by tracking a gaze of the driver.

In accordance with one aspect of the present disclosure, there is provided a method for adjusting a position of a driver assistance device according to a driver state, including steps of: (a) if at least one upper body image and at least one lower body image of a driver is acquired after the driver sits on a driver's seat of a vehicle and starts the vehicle, a position adjusting device performing a process of inputting the upper body image and the lower body image into a pose estimation network, to thereby allow the pose estimation network to (i) acquire one or more body keypoints, corresponding to the driver, located on the upper body image and the lower body image, (ii) calculate at least one body part length of the driver by referring to the body keypoints, and (iii) adjust a position of the driver's seat by referring to the calculated body part length of the driver; and (b) while the vehicle is traveling with the position of the driver's seat adjusted, the position adjusting device performing (i) a process of inputting the upper body image into a face detector, to thereby allow the face detector to detect at least one facial part of the driver from the upper body image, (ii) a process of inputting the facial part into an eye detector, to thereby allow the eye detector to detect at least one eye part of the driver from the facial part, and (iii) a process of inputting the position of the adjusted driver's seat and 2D coordinates corresponding to at least one eye of the driver in the detected eye part into a 3D coordinates transforming device, to thereby allow the 3D coordinates transforming device to generate 3D coordinates of the eye of the driver by referring to the 2D coordinates of the eye and the position of the driver's seat, and adjust at least one position of at least one mirror of the vehicle by referring to the 3D coordinates of the eye.

As one example, at the step of (a), the position adjusting device performs a process of instructing the pose estimation network to (i) generate each of one or more feature tensors by extracting one or more features from each of the upper body image and the lower body image via a feature extractor, (ii) generate each of one or more keypoint heatmaps and one or more part affinity fields corresponding to each of the feature tensors via a keypoint heatmap & part affinity field extractor, and (iii) extract one or more keypoints from each of the keypoint heatmaps and group each of the extracted keypoints by referring to each of the part affinity fields, and thus generate the body keypoints corresponding to the driver, via a keypoint grouping layer.

As one example, the position adjusting device instructs the pose estimation network to apply at least one convolution operation to each of the upper body image and the lower body image, to thereby generate each of the feature tensors, via at least one convolutional layer of the feature extractor.

As one example, the position adjusting device instructs the pose estimation network to apply at least one fully-convolution operation or at least one 1×1 convolution operation to each of the feature tensors, to thereby generate each of the keypoint heatmaps and each of the part affinity fields corresponding to said each of the feature tensors, via a fully convolutional network or at least one 1×1 convolutional layer of the keypoint heatmap & part affinity field extractor.

As one example, the position adjusting device instructs the pose estimation network to extract each of highest points on each of the keypoint heatmaps as each of the keypoints corresponding to said each of the keypoint heatmaps via the keypoint grouping layer.

As one example, the position adjusting device instructs the pose estimation network to connect pairs respectively having highest mutual connection probabilities of being connected among pairs of the extracted keypoints by referring to each of the part affinity fields, to thereby group the extracted keypoints, via the keypoint grouping layer.

As one example, at the step of (b), the position adjusting device instructs the face detector to (i) generate at least one feature map by applying at least one convolution operation to the upper body image via a convolutional layer, (ii) generate one or more proposal boxes, corresponding to one or more objects, on the feature map via a region proposal network, (iii) generate at least one feature vector by applying at least one pooling operation to one or more regions, corresponding to the proposal boxes, on the feature map via a pooling layer, (iv) generate at least one FC output by applying at least one fully-connected operation to the feature vector via a fully-connected layer, and (v) output class information and regression information on each of the objects by applying classification operation and regression operation to the FC output of the fully connected layer and thus detect the facial part of the driver on the upper body image via a classification layer and a regression layer wherein said each of the objects corresponds to each of the proposal boxes.

As one example, at the step of (b), the position adjusting device instructs the eye detector to convert the facial part into at least one Modified Census Transform (MCT) image wherein differences between a brightness of the facial part and an average of a brightness of a local part are encoded into the MCT image, and detect the eye part of the driver from feature data for eye detection acquired from the MCT image using Adaboost algorithm.

As one example, the position of the driver's seat is represented by a distance between the driver's seat and at least one camera for acquiring the upper body image.

As one example, at the step of (a), the position adjusting device performs a process of further adjusting a position of a steering wheel of the vehicle by referring to the body part length of the driver.

In accordance with another aspect of the present disclosure, there is provided a position adjusting device for adjusting a position of a driver assistance device according to a driver state, including: at least one memory that stores instructions; and at least one processor configured to execute the instructions to perform or support another device to perform: (I) if at least one upper body image and at least one lower body image of a driver is acquired after the driver sits on a driver's seat of a vehicle and starts the vehicle, a process of inputting the upper body image and the lower body image into a pose estimation network, to thereby allow the pose estimation network to (i) acquire one or more body keypoints, corresponding to the driver, located on the upper body image and the lower body image, (ii) calculate at least one body part length of the driver by referring to the body keypoints, and (iii) adjust a position of the driver's seat by referring to the calculated body part length of the driver; and (II) while the vehicle is traveling with the position of the driver's seat adjusted, (i) a process of inputting the upper body image into a face detector, to thereby allow the face detector to detect at least one facial part of the driver from the upper body image, (ii) a process of inputting the facial part into an eye detector, to thereby allow the eye detector to detect at least one eye part of the driver from the facial part, and (iii) a process of inputting the position of the adjusted driver's seat and 2D coordinates corresponding to at least one eye of the driver in the detected eye part into a 3D coordinates transforming device, to thereby allow the 3D coordinates transforming device to generate 3D coordinates of the eye of the driver by referring to the 2D coordinates of the eye and the position of the driver's seat, and adjust at least one position of at least one mirror of the vehicle by referring to the 3D coordinates of the eye.

As one example, at the process of (I), the processor performs a process of instructing the pose estimation network to (i) generate each of one or more feature tensors by extracting one or more features from each of the upper body image and the lower body image via a feature extractor, (ii) generate each of one or more keypoint heatmaps and one or more part affinity fields corresponding to each of the feature tensors via a keypoint heatmap & part affinity field extractor, and (iii) extract one or more keypoints from each of the keypoint heatmaps and group each of the extracted keypoints by referring to each of the part affinity fields, and thus generate the body keypoints corresponding to the driver, via a keypoint grouping layer.

As one example, the processor instructs the pose estimation network to apply at least one convolution operation to each of the upper body image and the lower body image, to thereby generate each of the feature tensors, via at least one convolutional layer of the feature extractor.

As one example, the processor instructs the pose estimation network to apply at least one fully-convolution operation or at least one 1×1 convolution operation to each of the feature tensors, to thereby generate each of the keypoint heatmaps and each of the part affinity fields corresponding to said each of the feature tensors, via a fully convolutional network or at least one 1×1 convolutional layer of the keypoint heatmap & part affinity field extractor.

As one example, the processor instructs the pose estimation network to extract each of highest points on each of the keypoint heatmaps as each of the keypoints corresponding to said each of the keypoint heatmaps via the keypoint grouping layer.

As one example, the processor instructs the pose estimation network to connect pairs respectively having highest mutual connection probabilities of being connected among pairs of the extracted keypoints by referring to each of the part affinity fields, to thereby group the extracted keypoints, via the keypoint grouping layer.

As one example, at the process of (II), the processor instructs the face detector to (i) generate at least one feature map by applying at least one convolution operation to the upper body image via a convolutional layer, (ii) generate one or more proposal boxes, corresponding to one or more objects, on the feature map via a region proposal network, (iii) generate at least one feature vector by applying at least one pooling operation to one or more regions, corresponding to the proposal boxes, on the feature map via a pooling layer, (iv) generate at least one FC output by applying at least one fully-connected operation to the feature vector via a fully-connected layer, and (v) output class information and regression information on each of the objects by applying classification operation and regression operation to the FC output of the fully connected layer and thus detect the facial part of the driver on the upper body image via a classification layer and a regression layer wherein said each of the objects corresponds to each of the proposal boxes.

As one example, at the process of (II), the processor instructs the eye detector to convert the facial part into at least one Modified Census Transform (MCT) image wherein differences between a brightness of the facial part and an average of a brightness of a local part are encoded into the MCT image, and detect the eye part of the driver from feature data for eye detection acquired from the MCT image using Adaboost algorithm.

As one example, the position of the driver's seat is represented by a distance between the driver's seat and at least one camera for acquiring the upper body image.

As one example, at the process of (I), the processor performs a process of further adjusting a position of a steering wheel of the vehicle by referring to the body part length of the driver.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIG. 3 is a drawing schematically illustrating a process of detecting body keypoints of a driver, in the method for adjusting the position of the driver assistance device according to the driver state in accordance with one example embodiment of the present disclosure.

FIG. 4 is a drawing schematically illustrating a process of detecting a face of the driver, in the method for adjusting the position of the driver assistance device according to the driver state in accordance with one example embodiment of the present disclosure.

DETAILED DESCRIPTION OF THE PREFERRED EMBODIMENTS

Figure 1:
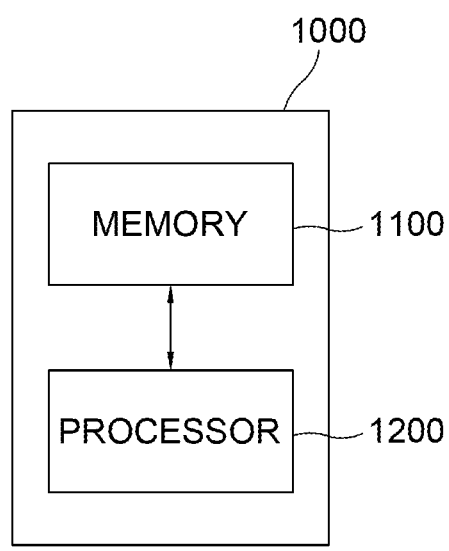
FIG. 1 is a drawing schematically illustrating a position adjusting device for adjusting a position of a driver assistance device according to a driver state in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

As used in this specification and the appended claims, the singular forms "a," "an," and "the" include plural referents unless the content and context clearly dictates otherwise.

To allow those skilled in the art to carry out the present disclosure easily, the example embodiments of the present disclosure by referring to attached diagrams will be explained in detail as shown below.

FIG. 1 is a drawing schematically illustrating a position adjusting device for adjusting a position of a driver assistance device according to a driver state in accordance with one example embodiment of the present disclosure. By referring to FIG. 1, the position adjusting device 1000 may include a memory 1100 for storing instructions to adjust the position of the driver assistance device according to the detected driver state and a processor 1200 for performing processes corresponding to the instructions in the memory 110 to adjust the position of the driver assistance device according to the driver state.

Specifically, the position adjusting device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 2:
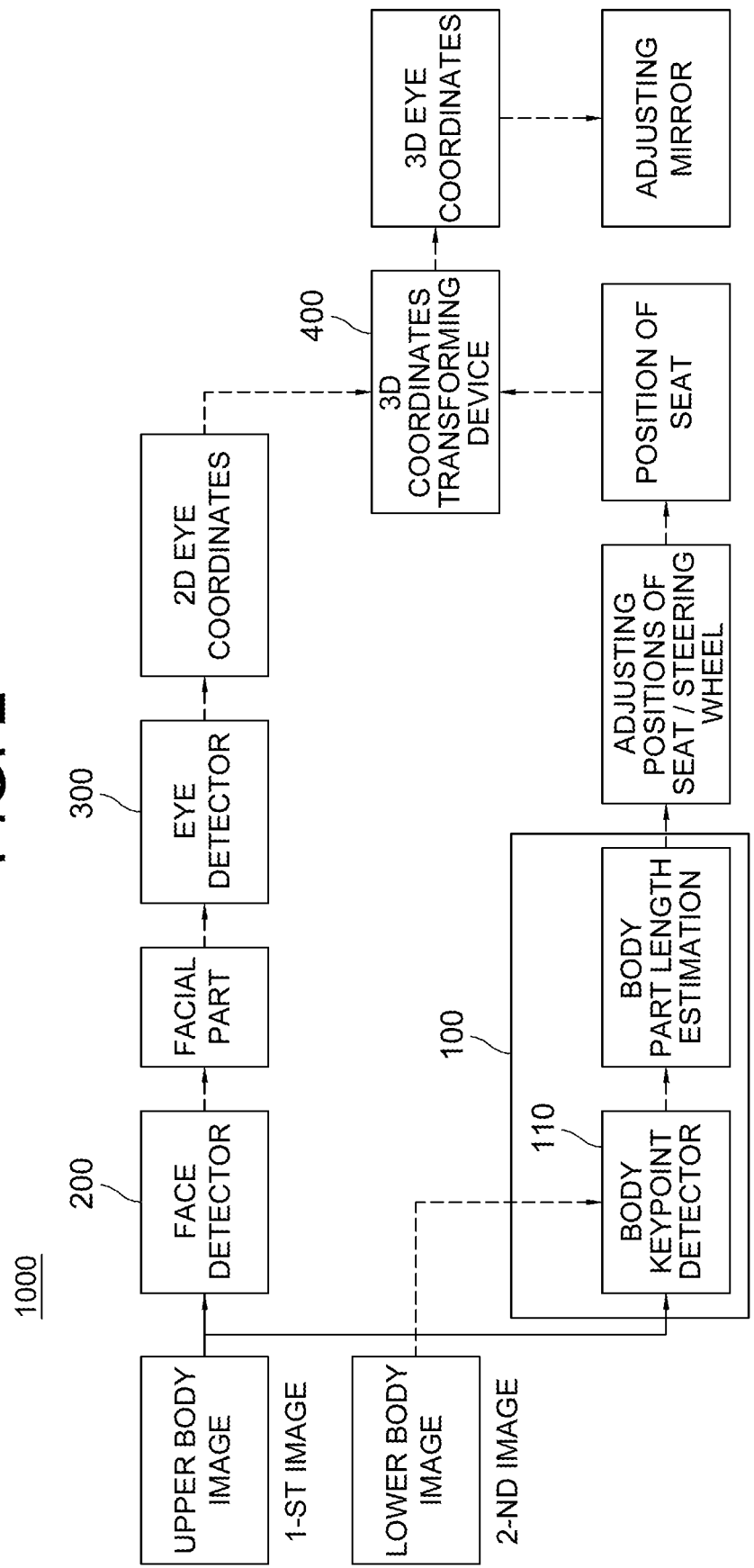
FIG. 2 is a drawing schematically illustrating a method for adjusting the position of the driver assistance device according to the driver state in accordance with one example embodiment of the present disclosure.

A method for adjusting the position of the driver assistance device according to the driver state by using the position adjusting device 1000 in accordance with one example embodiment of the present disclosure is described by referring to FIG. 2 as follows.

First, if at least one upper body image, which is a 1-st image, and at least one lower body image, which is a 2-nd image, of a driver are acquired after the driver sits on a driver's seat of a vehicle and starts the vehicle, the position adjusting device 1000 may perform a process of inputting the upper body image and the lower body image into a pose estimation network 100, to thereby allow the pose estimation network 100 to acquire one or more body keypoints, corresponding to the driver, located on the upper body image and the lower body image, and calculate at least one body part length of the driver by referring to the body keypoints.

Herein, the upper body image and the lower body image may be acquired by one or more cameras mounted inside the vehicle. And, the cameras may include at least one camera for photographing an upper body of the driver and at least one camera for photographing a lower body of the driver inside the vehicle. Also, the upper body and the lower body of the driver may be determined based on a navel of the driver, but the scope of the present disclosure is not limited thereto, and may be determined based on an arbitrary point such that at least one facial part of the driver is included in the upper body image of the driver.

And, the pose estimation network 100 may input the upper body image of the driver and the lower body image of the driver into a body keypoint detector 110, to thereby allow the body keypoint detector 110 to acquire the body keypoints corresponding to the driver from each of the upper body image and the lower body image.

Herein, videos or images taken by the cameras mounted inside the vehicle have much occlusion caused by bodies, and in that case, a conventional object detector will fail to detect the driver with much occlusion, but the body keypoint detector 110 may determine whether the driver is present by using visible points only, and because the driver on the vehicle has a larger pose variation, the body keypoint detector 110 is more useful than the conventional object detector.

As one example, by referring to FIG. 3, a process of the body keypoint detector 110 detecting the body keypoints is described as follows.

If the upper body image of the driver which is the 1-st image and the lower body image of the driver which is the 2-nd image are acquired, the body keypoint detector 110 may instruct the feature extractor network 111 to apply at least one convolution operation to each of the upper body image and the lower body image, to thereby output each of one or more feature tensors corresponding to each of the upper body image and the lower body image. Herein, the feature extraction network 111 may be one or more convolution blocks including one or more convolutional layers capable of performing at least one convolution operation.

And, the body keypoint detector 110 may input each of the feature tensors into the keypoint heatmap & part affinity field extractor 112, to thereby instruct the keypoint heatmap & part affinity field extractor 112 to generate (i) each of keypoint heatmaps corresponding to each of the feature tensors and (ii) each of part affinity fields which are vector maps representing relations between the keypoints. Herein, each of the part affinity fields may be a map showing connections of a specific keypoint with other keypoints, and may be a map representing each of mutual connection probabilities of each of the keypoints in each of keypoint heatmap pairs. And, a meaning of the "heatmap" may represent a combination of heat and a map, which may graphically show various information that can be expressed by colors as heat-like distribution on an image.

Herein, the keypoint heatmap & part affinity field extractor 112 may include a fully convolution network.

Also, the keypoint heatmap & part affinity field extractor 112 may include one or more 1×1 convolutional layers which apply at least one 1×1 convolution operation to the feature tensors.

Also, the keypoint heatmap & part affinity field extractor 112 may detect the relations among the keypoints by using a bipartite matching, to thereby generate the part affinity fields. That is, it may be confirmed by the bipartite matching that what the relations among the keypoints are.

Thereafter, the body keypoint detector 110 may instruct a keypoint grouping layer 113 to extract the keypoints from each of the keypoint heatmaps, and may connect and group the keypoints with highest probabilities as each of pairs by referring to the extracted mutual connection probabilities. Herein, the body keypoint detector may extract each of highest points in each of the keypoint heatmaps corresponding to each channel, that is, each of points having the highest heat value, as each of the keypoints corresponding to each of the keypoint heatmaps, and may pair the keypoints, respectively having their own corresponding highest probabilities of being connected to each other among the extracted keypoints, to thereby group the extracted keypoints by referring to the part affinity fields. As one example, a process of connecting a first keypoint among the extracted keypoints and a second keypoint among the extracted keypoints as a pair may be performed if the second keypoint is determined to have its corresponding highest probability of being connected to the first keypoint among the extracted keypoints. Herein, such a process may be performed with respect to all the extracted keypoints. Then, as a result, the extracted keypoints may be classified into one or more groups.

Next, by referring to FIG. 2 again, the position adjusting device 1000 may instruct the pose estimation network 100 to generate one or more body parts of the driver by referring to the body keypoints of the driver detected from each of the upper body image and the lower body image of the driver, and generate information on the body part length which is length information on the body parts by referring to the body parts. As one example, the information on the body-part length may include widths of shoulders, lengths of arms, lengths of legs, a height, etc. of the driver.

Next, the position adjusting device 1000 may adjust the driver assistance device, such that, for example, a position of the driver's seat or a position of a steering wheel is adjusted according to the information on the body part length of the driver confirmed by the pose estimation network 100.

Next, on condition that the position of the driver's seat has been adjusted according to the driver state by the processes above, the position adjusting device 1000 may input the upper body image of the driver, which is the acquired 1-st image, into a face detector 200, to thereby allow the face detector 200 to detect the facial part of the driver from the upper body image. Herein, the face detector 200 may be a detector based on a CNN (Convolutional Neural Network), but the scope of the present disclosure is not limited thereto. Also, the face detector 200 is described as detecting the facial part of the driver from the whole upper body image, however, as another example, the upper body image may be cropped such that only a specific region, where a face is estimated as located, of the upper body image may be used for face detection.

As one example, by referring to FIG. 4, the face detector 200 based on the CNN may perform a process of generating at least one feature map by applying at least one convolution operation to the upper body image via at least one convolutional layer 201 and a process of generating one or more proposal boxes, corresponding to one or more objects, on the feature map via a region proposal network (RPN) 202. And, the face detector 200 may perform a process of generating at least one feature vector by applying at least one pooling operation to one or more regions, corresponding to the proposal boxes, on the feature map via a pooling layer 203, and a process of generating at least one FC output by applying at least one fully-connected operation to the feature vector via a fully connected layer 204. Thereafter, the face detector 200 may output class information and regression information on each of the objects by applying classification operation and regression operation to the FC output of the fully connected layer 204 and thus detect the facial part of the driver on the interior image via a classification layer 205 and a regression layer 206, where said each of the objects corresponds to each of the proposal boxes. Next, by referring to FIG. 2 again, the position adjusting device 1000 may instruct an eye detector 300 to detect at least one eye part in the facial part of the driver detected from the face detector 200, to thereby generate 2D coordinates of at least one eye.

As one example, the eye detector 300 may convert the facial part into at least one Modified Census Transform (MCT) image where differences between a brightness of the facial part and an average of a brightness of a local part are encoded, and detect the eye part of the driver from feature data for eye detection acquired from the MCT image using Adaboost algorithm.

Next, the position adjusting device 1000 may perform a process of inputting the position of the adjusted driver's seat and the 2D coordinates corresponding to the eye of the driver in the detected eye part into a 3D coordinates transforming device 400, to thereby allow the 3D coordinates transforming device 400 to generate 3D coordinates of the eye of the driver by referring to the 2D coordinates of the eye and the position of the adjusted driver's seat, and adjust at least one position of at least one mirror of the vehicle by referring to the 3D coordinates of the eye.

That is, a distance between the driver's seat and the camera for obtaining the upper body image of the driver may be acquired by referring to the position of the driver's seat adjusted according to the body part length, and the 3D coordinates of the eye may be acquired by using the 2D coordinates of the eye and the distance between the camera and the adjusted driver's seat.

And, the position adjusting device 1000 may (i) estimate a gazing direction of the driver by referring to the 3D coordinates of the eye, (ii) automatically adjust a reflecting angle of the mirror according to the estimated gazing direction of the driver by adjusting the position of the mirror, i.e., the angle of the mirror, according to the estimated gazing direction of the driver, to thereby allow the driver to be aware of surroundings of the vehicle.

Meanwhile, as another example, a single image of the driver may be used, instead of using the upper body image and the lower body image of the driver. That is, the body keypoints and the facial part of the driver may be detected from the single image of the driver.

As described above, the present disclosure monitors a driver state by using an image of the driver taken from the camera, adjusts the position of the driver's seat according to the body part length using the body keypoints of the driver, and adjusts the angle of the mirror according to a gaze of the driver determined by gaze-monitoring of the driver, to thereby allow personalization and on-line calibration of the driver assistance device.

The present disclosure has an effect of improving convenience of the driver by automatically adjusting the driver assistance device according to the driver state.

The present disclosure has another effect of improving the convenience of the driver by automatically adjusting the position of the driver's seat according to the driver state.

The present disclosure has still another effect of improving the convenience of the driver by automatically adjusting positions of mirrors in real-time by tracking the gaze of the driver, and preventing traffic accidents by allowing the driver to perceive the surroundings by using the mirrors.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for adjusting a position of a driver assistance device according to a driver state, comprising steps of:

(a) if at least one upper body image and at least one lower body image of a driver is acquired after the driver sits on a driver's seat of a vehicle and starts the vehicle, a position adjusting device performing a process of inputting the upper body image and the lower body image into a pose estimation network, to thereby allow the pose estimation network to (i) acquire one or more body keypoints, corresponding to the driver, located on the upper body image and the lower body image, (ii) calculate at least one body part length of the driver by referring to the body keypoints, and (iii) adjust a position of the driver's seat by referring to the calculated body part length of the driver; and (b) while the vehicle is traveling with the position of the driver's seat adjusted, the position adjusting device performing (i) a process of inputting the upper body image into a face detector, to thereby allow the face detector to detect at least one facial part of the driver from the upper body image, (ii) a process of inputting the facial part into an eye detector, to thereby allow the eye detector to detect at least one eye part of the driver from the facial part, and (iii) a process of inputting the position of the adjusted driver's seat and 2D coordinates corresponding to at least one eye of the driver in the detected eye part into a 3D coordinates transforming device, to thereby allow the 3D coordinates transforming device to generate 3D coordinates of the eye of the driver by referring to the 2D coordinates of the eye and the position of the driver's seat, and adjust at least one position of at least one mirror of the vehicle by referring to the 3D coordinates of the eye;

wherein, at the step of (b), the position adjusting device instructs the face detector to (i) generate at least one feature map by applying at least one convolution operation to the upper body image via a convolutional layer, (ii) generate one or more proposal boxes, corresponding to one or more objects, on the feature map via a region proposal network, (iii) generate at least one feature vector by applying at least one pooling operation to one or more regions, corresponding to the proposal boxes, on the feature map via a pooling layer, (iv) generate at least one fully connected ("FC") output by applying at least one fully-connected operation to the feature vector via a fully-connected layer, and (v) output class information and regression information on each of the objects by applying classification operation and regression operation to the FC output of the fully connected layer and thus detect the facial part of the driver on the upper body image via a classification layer and a regression layer wherein said each of the objects corresponds to each of the proposal boxes, wherein, at the step of (b), the position adjusting device instructs the eye detector to convert the facial part into at least one Modified Census Transform (MCT) image wherein differences between a brightness of the facial part and an average of a brightness of a local part are encoded into the MCT image, and detect the eye part of the driver from feature data for eye detection acquired from the MCT image using Adaboost algorithm.

2. The method of claim 1, wherein, at the step of (a), the position adjusting device performs a process of instructing the pose estimation network to (i) generate each of one or more feature tensors by extracting one or more features from each of the upper body image and the lower body image via a feature extractor, (ii) generate each of one or more keypoint heatmaps and one or more part affinity fields corresponding to each of the feature tensors via a keypoint heatmap & part affinity field extractor, and (iii) extract one or more keypoints from each of the keypoint heatmaps and group each of the extracted keypoints by referring to each of the part affinity fields, and thus generate the body keypoints corresponding to the driver, via a keypoint grouping layer.

3. The method of claim 2, wherein the position adjusting device instructs the pose estimation network to apply at least one convolution operation to each of the upper body image and the lower body image, to thereby generate each of the feature tensors, via at least one convolutional layer of the feature extractor.

4. The method of claim 2, wherein the position adjusting device instructs the pose estimation network to apply at least one fully-convolution operation or at least one 1×1 convolution operation to each of the feature tensors, to thereby generate each of the keypoint heatmaps and each of the part affinity fields corresponding to said each of the feature tensors, via a fully convolutional network or at least one 1×1 convolutional layer of the keypoint heatmap & part affinity field extractor.

5. The method of claim 2, wherein the position adjusting device instructs the pose estimation network to extract each of highest points on each of the keypoint heatmaps as each of the keypoints corresponding to said each of the keypoint heatmaps via the keypoint grouping layer.

6. The method of claim 5, wherein the position adjusting device instructs the pose estimation network to connect pairs respectively having highest mutual connection probabilities of being connected among pairs of the extracted keypoints by referring to each of the part affinity fields, to thereby group the extracted keypoints, via the keypoint grouping layer.

7. The method of claim 1, wherein the position of the driver's seat is represented by a distance between the driver's seat and at least one camera for acquiring the upper body image.

8. The method of claim 1, wherein, at the step of (a), the position adjusting device performs a process of further adjusting a position of a steering wheel of the vehicle by referring to the body part length of the driver.

9. A position adjusting device for adjusting a position of a driver assistance device according to a driver state, comprising:
at least one memory that stores instructions; and
at least one processor configured to execute the instructions to perform or support another device to perform: (I) if at least one upper body image and at least one lower body image of a driver is acquired after the driver sits on a driver's seat of a vehicle and starts the vehicle, a process of inputting the upper body image and the lower body image into a pose estimation network, to thereby allow the pose estimation network to (i) acquire one or more body keypoints, corresponding to the driver, located on the upper body image and the lower body image, (ii) calculate at least one body part length of the driver by referring to the body keypoints, and (iii) adjust a position of the driver's seat by referring to the calculated body part length of the driver, and (II) while the vehicle is traveling with the position of the driver's seat adjusted, (i) a process of inputting the upper body image into a face detector, to thereby allow the face detector to detect at least one facial part of the driver from the upper body image, (ii) a process of inputting the facial part into an eye detector, to thereby allow the eye detector to detect at least one eye part of the driver from the facial part, and (iii) a process of inputting the position of the adjusted driver's seat and 2D coordinates corresponding to at least one eye of the driver in the detected eye part into a 3D coordinates transforming device, to thereby allow the 3D coordinates transforming device to generate 3D coordinates of the eye of the driver by referring to the 2D coordinates of the eye and the position of the driver's seat, and adjust at least one position of at least one mirror of the vehicle by referring to the 3D coordinates of the eye;

wherein, at the process of (II), the processor instructs the face detector to (i) generate at least one feature map by applying at least one convolution operation to the upper body image via a convolutional layer, (ii) generate one or more proposal boxes, corresponding to one or more objects, on the feature map via a region proposal network, (iii) generate at least one feature vector by applying at least one pooling operation to one or more regions, corresponding to the proposal boxes, on the feature map via a pooling layer, (iv) generate at least one fully connected ("FC") output by applying at least one fully-connected operation to the feature vector via a fully-connected layer, and (v) output class information and regression information on each of the objects by applying classification operation and regression operation to the FC output of the fully connected layer and thus detect the facial part of the driver on the upper body image via a classification layer and a regression layer wherein said each of the objects corresponds to each of the proposal boxes;

wherein, at the process of (II), the processor instructs the eye detector to convert the facial part into at least one Modified Census Transform (MCT) image wherein differences between a brightness of the facial part and an average of a brightness of a local part are encoded into the MCT image, and detect the eye part of the driver from feature data for eye detection acquired from the MCT image using Adaboost algorithm.

10. The position adjusting device of claim 9, wherein, at the process of (I), the processor performs a process of instructing the pose estimation network to (i) generate each of one or more feature tensors by extracting one or more features from each of the upper body image and the lower body image via a feature extractor, (ii) generate each of one or more keypoint heatmaps and one or more part affinity fields corresponding to each of the feature tensors via a keypoint heatmap & part affinity field extractor, and (iii) extract one or more keypoints from each of the keypoint heatmaps and group each of the extracted keypoints by referring to each of the part affinity fields, and thus generate the body keypoints corresponding to the driver, via a keypoint grouping layer.

11. The position adjusting device of claim 10, wherein the processor instructs the pose estimation network to apply at least one convolution operation to each of the upper body image and the lower body image, to thereby generate each of the feature tensors, via at least one convolutional layer of the feature extractor.

12. The position adjusting device of claim 10, wherein the processor instructs the pose estimation network to apply at least one fully-convolution operation or at least one 1×1 convolution operation to each of the feature tensors, to thereby generate each of the keypoint heatmaps and each of the part affinity fields corresponding to said each of the feature tensors, via a fully convolutional network or at least one 1×1 convolutional layer of the keypoint heatmap & part affinity field extractor.

13. The position adjusting device of claim 10, wherein the processor instructs the pose estimation network to extract each of highest points on each of the keypoint heatmaps as each of the keypoints corresponding to said each of the keypoint heatmaps via the keypoint grouping layer.

14. The position adjusting device of claim 13, wherein the processor instructs the pose estimation network to connect pairs respectively having highest mutual connection probabilities of being connected among pairs of the extracted keypoints by referring to each of the part affinity fields, to thereby group the extracted keypoints, via the keypoint grouping layer.

15. The position adjusting device of claim 9, wherein the position of the driver's seat is represented by a distance between the driver's seat and at least one camera for acquiring the upper body image.

16. The position adjusting device of claim 9, wherein, at the process of (I), the processor performs a process of further adjusting a position of a steering wheel of the vehicle by referring to the body part length of the driver.

* * * * *